United States Patent [19]

Fan et al.

[11] Patent Number: 5,539,267

[45] Date of Patent: Jul. 23, 1996

[54] MICROFABRICATED ROTARY MOTION WOBBLE MOTOR AND DISK DRIVE INCORPORATING IT

[75] Inventors: Long-Sheng Fan; Robert E. Fontana, Jr.; Archibald C. Munce, Jr., all of San Jose; Timothy C. Reiley, Los Gatos; Hans H. Zappe, San Jose, all of Calif.

[73] Assignee: International Business Machines Corporation, Armonk, N.Y.

[21] Appl. No.: 378,490

[22] Filed: Jul. 21, 1994

[51] Int. Cl.$^6$ ............................... H02N 1/00; H02K 7/06; G11B 17/02

[52] U.S. Cl. .................... 310/309; 310/40 MM; 310/80; 360/99.08

[58] Field of Search ............................. 310/309, 80, 308, 310/40 MM; 360/98.07, 99.04, 99.08

[56] References Cited

U.S. PATENT DOCUMENTS

| | | | |
|---|---|---|---|
| 4,740,410 | 4/1988 | Muller et al. | 428/133 |
| 4,943,750 | 7/1990 | Howe et al. | 310/309 |
| 4,997,521 | 3/1991 | Howe et al. | 216/17 |
| 5,043,043 | 8/1991 | Howe et al. | 156/645 |
| 5,093,594 | 3/1992 | Mehregany | 310/82 |
| 5,180,940 | 1/1993 | Paratte et al. | 310/40 MM |
| 5,191,251 | 3/1993 | Paratte | 310/309 |
| 5,206,983 | 5/1993 | Guckel et al. | 29/598 |
| 5,252,881 | 10/1993 | Muller et al. | 310/309 |
| 5,327,033 | 7/1994 | Guckel et al. | 310/40 MM |
| 5,377,060 | 12/1994 | Nigam | 360/99.01 |
| 5,455,730 | 10/1995 | Dovek et al. | 360/113 |

OTHER PUBLICATIONS

S. C. Jacobsen et al., "The Wobble Motor: Design, Fabrication and Testing of An Accentric–motion Electrostatic Microactuator", IEEE, 1989, pp. 1536–1546.

S. C. Jacobsen et al., "Design, Analysis, and Experimental Results for the Wobble Motor: An Eccentric–motion Electrostatic Microactuator", SPIE, vol. 1167, Precision Engineering and Optomechanics, 1989, pp. 122–136.

S. C. Jacobsen et al., "Micromotors Split Hairs", IEEE Potentials, Feb. 1991, pp. 12–15.

M. Mehregany et al., "Friction and Wear in Microfabricated Harmonic Side–drive Motors", 1990 IEEE Solid State Sensor and Actuator Workshop–Technical Digest, pp. 17–22.

L. Paratte et al., "A Rigid Ring Electrostatic Harmonic Wobble Motor with Axial Field", 1991 IEEE International Conference on Solid–state Sensors and Actuators, pp. 890–893.

R. H. Price et al., "Field Analysis for the Electrostatic Eccentric Drive Micromotor ('Wobble Motor')", Journal of Electrostatics, vol. 28, 1992, pp. 7–38.

*Primary Examiner*—Thomas M. Dougherty
*Assistant Examiner*—Christopher Cuneo
*Attorney, Agent, or Firm*—Thomas R. Berthold

[57] ABSTRACT

A motor based on the wobble motor provides pure rotary motion and can be used as a spindle motor for very small disk drives. The primary components of the motor are fabricated using thin film processes. The rotor has inner and outer rings that are interconnected by flexible members, such as semicircularly-shaped spring elements, with the rings and flexible members being formed of the same material. The rotor resides within the wobble motor stator elements that are circumferentially spaced on a substrate. The inner rotor ring is supported by a bearing structure that may be a ball bearing assembly or a pin bearing comprising a post and a restraining cap. The outer rotor ring functions as the wobble motor rotor and rolls around the inside of the stator as the stator elements are sequentially electrostatically activated. The flexible members act as a transmission to convert the wobble motion of the outer rotor ring to pure rotary motion of the inner rotor ring. The motor can function as a disk drive spindle motor by attachment of a data recording disk to the inner rotor ring and use of appropriate control circuitry to drive the motor at constant speed. The disk drive actuator may be attached to the same substrate that supports the stator elements. The stator elements, the rotor, and the bearing assembly may all be fabricated on a suitable substrate using thin film processes, without the necessity of assembly of separate components.

21 Claims, 8 Drawing Sheets

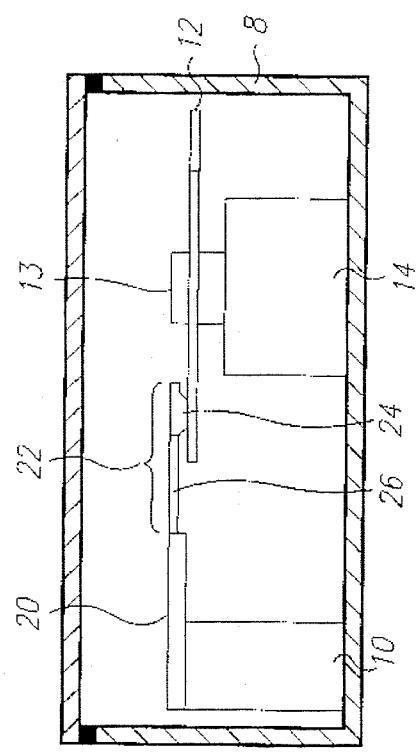
PRIOR ART FIG. 1
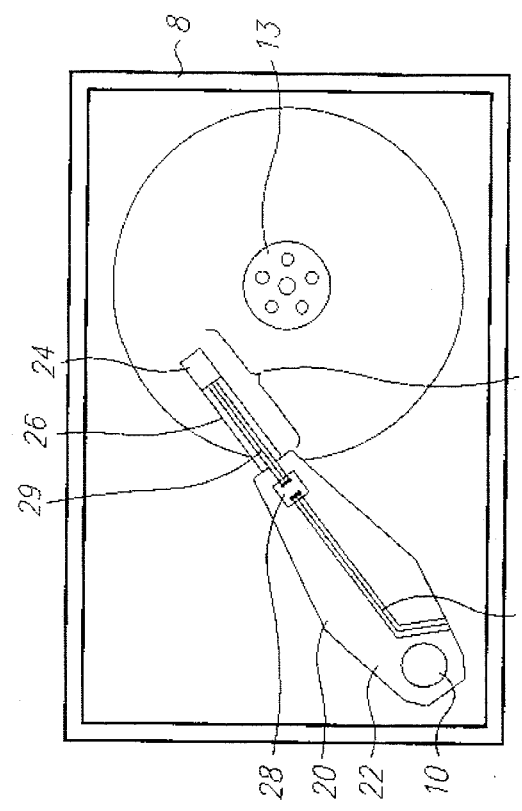
PRIOR ART FIG. 2

MICROFABRICATED ROTARY MOTION WOBBLE MOTOR AND DISK DRIVE INCORPORATING IT

TECHNICAL FIELD

This invention relates in general to micromechanical wobble motors and in particular to a disk drive that uses such a motor as the spindle motor for rotating the data recording disks.

BACKGROUND OF THE INVENTION

Disk drives, also called disk files, are information storage devices that use a rotatable disk with concentric data tracks containing the information, a head or transducer for reading and/or writing data onto the various tracks, and an actuator connected to a carrier for the head for moving the head across the disk. A servo control system receives prerecorded servo positioning information read from the disk by the head, and sends control signals to the actuator to move the head to the desired track and maintain it over the track centerline. There are typically a number of disks mounted on a hub that is rotated by a spindle motor, and a number of head carriers for accessing the surfaces of the disks. The head carriers are supported on arms attached to the actuator.

Disk drives have undergone a rapid reduction in size. There are now commercially available disk drives that use disks with a 1.3-inch diameter. As the trend to reduced size continues, it becomes necessary to find smaller and easily manufacturable components. Because the conventional spindle motor is relatively complex to build on a small scale and is not readily capable of batch fabrication, the need arises for a new type of spindle motor that can be used with very small disk drives.

Micromechanical wobble motors, also called electrostatic harmonic motors, have been built on the scale of several hundred microns using semiconductor or thin film fabrication processes. The version of the wobble motor referred to here is one in which the static and movable elements remain coplanar during operation. The wobble motor provides planetary or eccentric rotational motion of an output shaft that is located within or surrounds a stator having a plurality of circumferentially-spaced stator elements. As the stator elements are sequentially electrostatically activated with respect to the grounded rotor, the rotor rolls around the stator. Because one complete electrical cycle of all of the stator elements causes the rotor to make much less than one complete revolution, the relatively high ratio of stator electrical cycles to rotor output shaft revolutions generates a high output torque. The high output torque of wobble motors makes them likely candidates for disk drive spindle motors to drive small (subcentimeter) diameter disks. However, the planetary motion of the output shaft renders them unusable as disk drive spindle motors because this motion is not compatible with conventional disk drive servo control systems.

What is needed is a micromechanical motor that exploits the batch fabrication and high torque advantages of the wobble motor, but which provides the rotary motion necessary for a disk drive spindle motor, rather than the conventional planetary motion.

SUMMARY OF THE INVENTION

The invention is a motor, based on the wobble motor, that provides pure rotary motion and can be used as a spindle motor for very small disk drives. The primary components of the motor are fabricated using thin film processes. In the preferred embodiment, the rotor has inner and outer rings that are interconnected by flexible members, such as semi-circularly-shaped spring elements, with the rings and flexible members being formed of the same material. The rotor resides within the wobble motor stator elements that are circumferentially spaced on a substrate. The inner rotor ring is supported by a bearing structure that may be a ball bearing assembly, a pin bearing comprising a post and a restraining cap, or other bearing structure, such as a fluid bearing. The outer rotor ring functions as the wobble motor rotor and rolls around the inside of the stator as the stator elements are sequentially electrostatically activated. The flexible members act as a transmission to convert the wobble motion of the outer rotor ring to pure rotary motion of the inner rotor ring. The motor can function as a disk drive spindle motor by attachment of a data recording disk to the inner rotor ring and use of appropriate control circuitry to drive the motor at constant speed. The disk drive actuator may be attached to the same substrate that supports the stator elements. In one embodiment the stator elements, the rotor, and the bearing assembly are all fabricated on a suitable substrate using thin film processes, without the necessity of assembly of separate components.

BRIEF DESCRIPTION OF THE DRAWINGS

FIG. 1 is a side sectional view of a contact recording disk drive with a conventional spindle motor.

FIG. 2 is a top view of the disk drive of FIG. 1 with the disk drive cover removed.

FIGS. 8A–8I are sectional views illustrating the process steps in fabricating the integrated embodiment of the motor of the present invention.

DETAILED DESCRIPTION OF THE PREFERRED EMBODIMENTS

Figure 3:
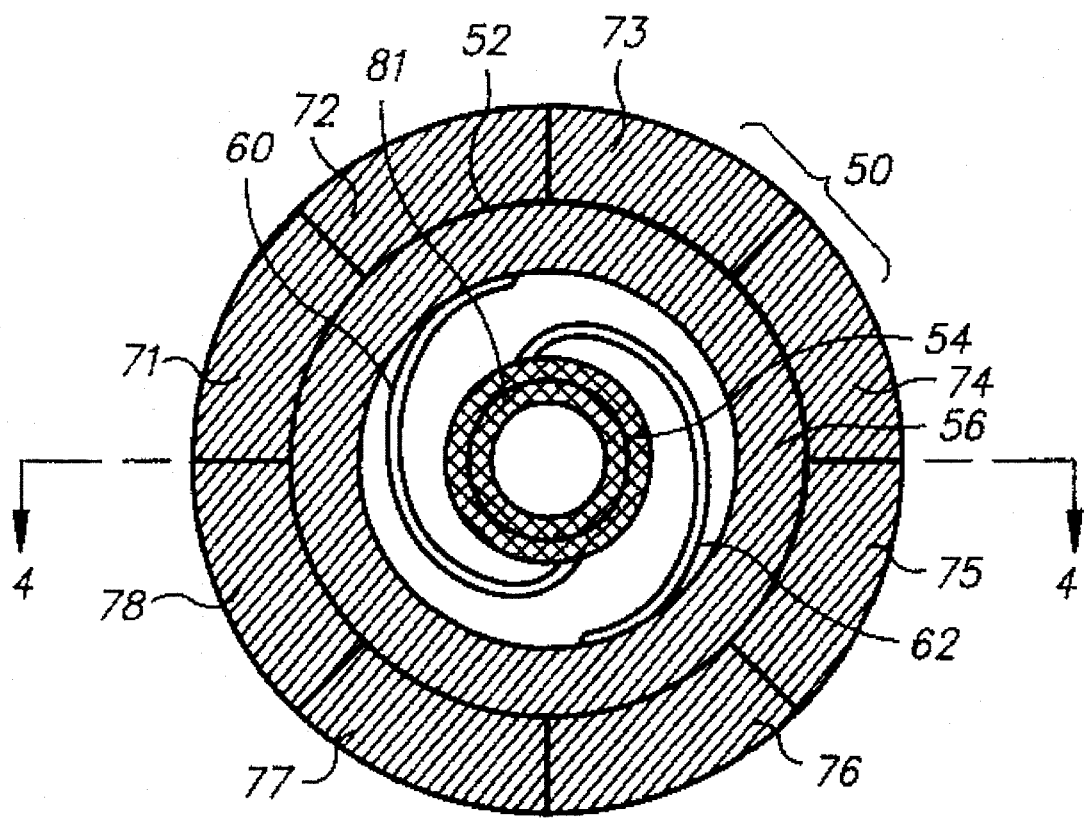
FIG. 3 is a top view of the motor of the present invention without a disk attached.

FIGS. 1 and 2 illustrate a contact recording disk drive including a housing 8 in which is mounted a rotary actuator 10 and a spindle motor 14. A magnetic storage disk 12 is mounted on a spindle 13 which is rotated by the spindle motor 14. The spindle motor 14 is typically a "delta" or "Y", type brushless three-phase motor with fixed windings as field coils and a permanent magnet rotor. Spindle driver circuitry controls the current from the power supply (e.g., a 5V battery source in the case of notebook and laptop computers) to the windings of spindle motor 14 to rotate the motor and attached disk 12 at a constant rotational speed. The disk 12 is a substrate, typically of glass, ceramic, or an aluminum alloy, with a thin metal alloy film, such as a cobalt-based alloy, as the magnetic recording layer.

The rotary actuator 10 moves a head-suspension assembly 22 in an arcuate path across the disk 12. The rotary actuator 10 is typically a voice coil motor (VCM), which comprises a coil movable within the magnetic field of a fixed permanent, magnet assembly. The actuator 10 has an arm 20 that is attached to the head-suspension assembly 22. The single-piece head-suspension assembly 22 includes a head-carrier segment 24 and a suspension section 26. Although head-suspension assembly 22 is depicted as a unitary body, it may also be of a two-piece construction where the carrier segment 24 is joined to the suspension section 26. The suspension section 26 of the head-suspension assembly 22 provides a load to the head-carrier segment 24, which is generally perpendicular to the surface of disk 12. This load maintains the head-carrier segment 24 in contact with the data surface of disk 12 during rotation of the disk 12. The head carrier 24 has embedded within it an inductive read/write head, which includes a pole piece and a horizontally-oriented coil, for reading and writing data on the surface of disk 12. Alternatively, the head can be an inductive write head and a magnetoresistive read head.

The data detected from disk 12 by the head is processed into a data readback signal by signal amplification and processing circuitry in the integrated circuit chip 28 located on actuator arm 20. The signals from the head in carrier segment 24 travel via conductors 29 to chip 28, which sends its output signals via cable 31. The conductors 29 may be patterned directly onto the suspension section 26.

The above description is of a contact recording magnetic disk drive, and the accompanying FIGS. 1 and 2 are for representation purposes only. Disk drives may contain a number of disks and actuators, and each actuator may support a number of heads. In addition, instead of a contact recording disk drive with an integrated head-suspension assembly that maintains the head carrier in contact with the disk during read and write operations, the disk drive may be a conventional air-bearing drive where the head carrier is an air-bearing slider attached to a separate suspension.

The microfabricated motor suitable for use as a spindle motor in data recording disk drives is shown in a top view in FIG. 3. The motor is based on a wobble motor and includes a stator 50 and a rotor 52. The stator 50 includes eight discrete circumferentially-spaced stator elements 71–78. The rotor 52 includes an inner ring 54, an outer ting 56, and, two generally semicircularly-shaped flexible members 60, 62 that serve as springs to interconnect the rotor rings 54, 56. The rotor inner ring 54 is supported by a bearing structure. In the preferred embodiment, the beating structure is a rotary ball bearing assembly 80 (FIG. 4), the inner race 81 being shown in FIG. 3.

Figure 4:
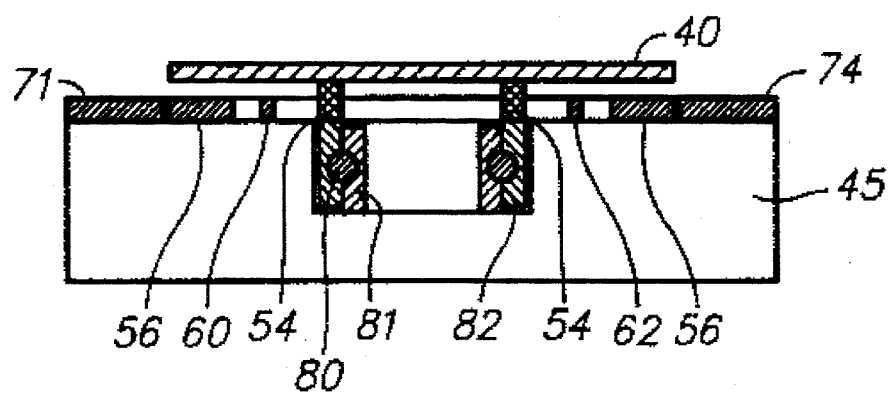
FIG. 4 is a side sectional view of Section 4—4 of FIG. 3 but with a data recording disk attached.

FIG. 4 is a view of Section 4—4 of FIG. 3 but with the addition of a data recording disk 40. All of the stator elements (elements 71 and 74 being shown in FIG. 4) are formed on a base or substrate 45. The substrate 45 can be the base which also supports the disk drive actuator. The ball beating assembly 80 is located in a recess in substrate 45 with the inner race 81 being secured to the substrate 45. The inner rotor ring 54 is attached to the rotatable outer race 82 of the ball beating assembly. The disk 40 is attached to the inner rotor ting 54. When the stator elements 71–78 are sequentially electrostatically activated with respect to the grounded outer cylindrical surface of outer rotor ring 56, the outer rotor ring 56 rolls around the inner cylindrical surface defined by the circumferentially-spaced stator elements 71–78. This motion of the outer ting 56 is the conventional planetary motion or wobble of the wobble motor. The "gear ratio" of the wobble motor is determined by the size of the annular gap, which is the difference between the inner radius of the stator 50 and the outer radius of the outer rotor ting 56. For example, if the outer rotor ting 56 has an outer radius of 5.000 mm and the annular gap is 0.01 mm, then the gear ratio is 500:1, which means that a single cycle through all eight stator elements 71–78 will rotate the outer rotor ting $1/500^{th}$ of a complete circle.

The inner rotor ting 54 is connected to the outer ting 56 by the flexible members 60, 62 and thus also rotates with the rotation of outer ting 56. However, because inner ting 54 is secured to the beating assembly 80, it is forced to rotate without wobble, i.e., in a pure rotary motion. The flexible members 60, 62 thus absorb the wobble and serve as a transmission to transfer the planetary motion of the outer rotor ting 56 to rotary motion of the inner rotor ting 54. As shown in FIG. 2, the flexible members 60, 62 have a generally semicircular shape with their ends attached to the rotor tings. The flexible members must be designed so as to have relatively low stiffness in the radial direction, yet sufficient tensile strength to transfer the rotational motion. For the motor shown in FIGS. 3 and 4 sized so that the disk 40 has a diameter of approximately 6 mm, if the members 60, 62 are formed of nickel with a height (FIG. 4) of 50 microns and a thickness (FIG. 3) of 50 microns, they will have a radial spring constant of approximately 10 N/m and a tangential spring constant of approximately 40 micro-N-m. The motor may be constructed with more than two flexible members and with flexible member shapes other than semicircular, as long as the criteria of low radial stiffness and sufficient tensile strength are met.

Figure 5:
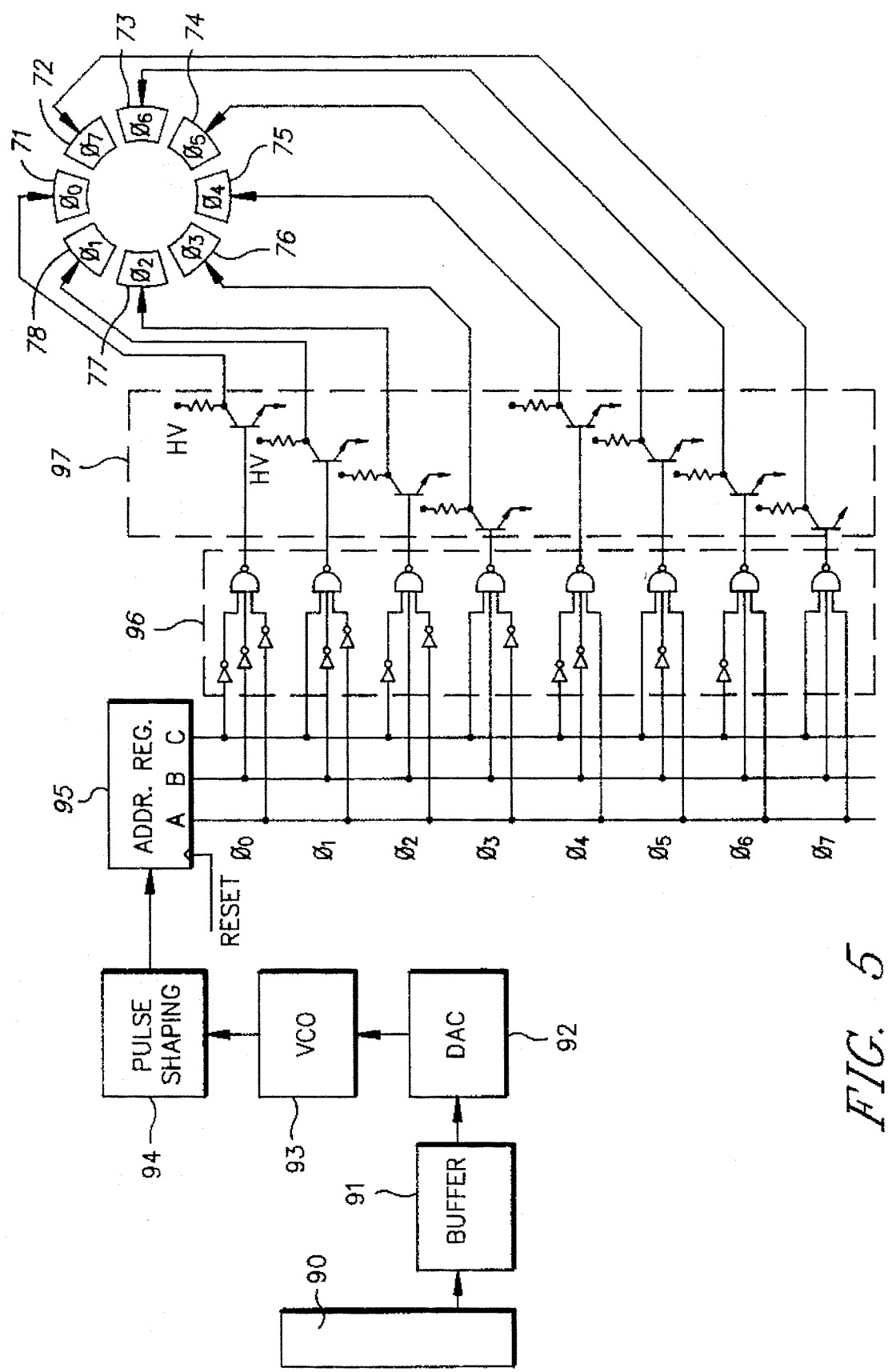
FIG. 5 is a block diagram of the control circuitry for the motor of the present invention.

The circuitry for controlling the wobble motor-based spindle motor is shown in FIG. 5. The control circuitry includes a voltage-controlled oscillator (VCO) 93, pulse shaping circuitry 94, an address register 95, a decoder 96, and driver circuitry 97. A digital signal corresponding to the desired motor rotational speed is sent from the disk drive controller 90 to a buffer 91 where it is available to digital-to-analog converter (DAC) 92. The output of DAC 92 is used to control the frequency output of VCO 93. The sinusoidal output of VCO 93 is shaped into square pulses by pulse-shaping circuitry 94 that are fed into the clock input of address register 95. The address register 95 latches the stator addresses sequentially with each clock cycle. The stator address is decoded by the address decoder 96 and sent to the driver 97, which is connected directly to the eight stator elements 71–78 and supplies driving voltages to the stator elements. The decoder 96 is a typical combinatorial logic circuit. The driver 97 can be implemented as a bipolar circuit connected to the stator elements, as shown in FIG. 5. The decoder 96 selects the addressed line and turns the corresponding driver transistor off. The series resistor in turn charges up the connected stator element, which attracts the rotor toward it. An 8-stator element motor is shown in FIG. 5, although the number of stator elements is not limited to this number. For an 8-stator element motor, a 3-bit address (ABC) is adequate. The stator elements 71–78 are thus sequentially activated to generate planetary motion of the outer rotor ring 56 (FIG. 3), which is transmitted into pure rotary motion of the inner rotor ring 54 (FIG. 3). The use of an address register 95 and decoder 96 permits flexibility because individual stator elements can be separately addressed. However, it is possible to replace address register 95 and decoder 96 with a shift register and ring counter having eight output lines, each line being connected to a stator element, if it is desired to be able to only address the stator elements sequentially.

In the process for fabricating the motor shown in FIGS. 3 and 4, the rotor 52 is fabricated separately as a discrete component and then placed into the stator 50, which is separately formed on the substrate 45. FIGS. 6A–6D show the process for fabricating the rotor 52, and FIGS. 7A–7E show the process for forming the stator 50 and installing the ball bearing assembly 80 on the substrate 45.

Figure 6A:
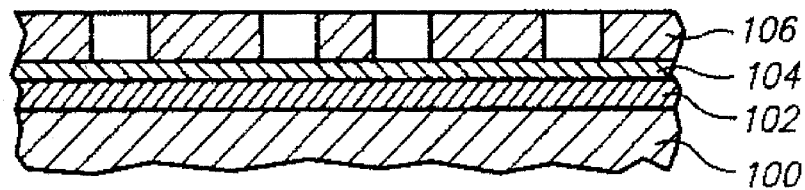
FIGS. 6A–6D are sectional views illustrating the process steps in fabricating the rotor portion of the motor of the present invention.
Figure 6B:
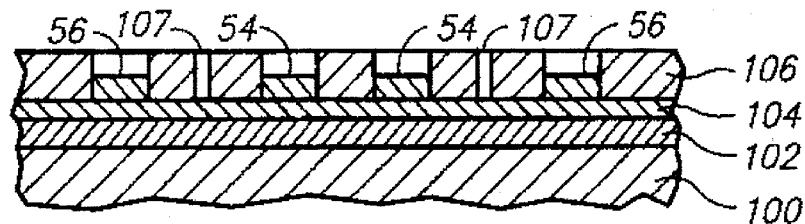
Figure 6C:
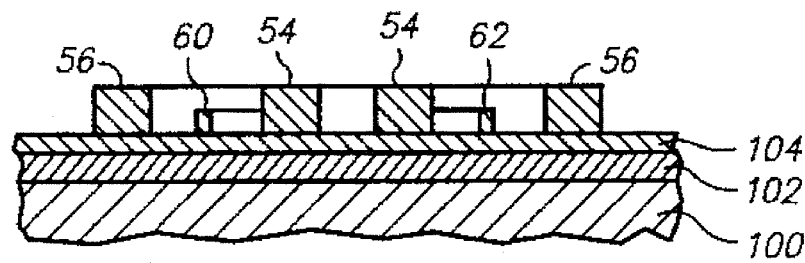

Referring first to FIG. 6A, on a Si substrate 100 a release layer 102 of SiO$_2$ is deposited to a thickness of 1 micron, followed by a seedlayer 104 of Cu to a thickness of 0.1 micron. A photoresist layer 106 is then applied and exposed, leaving openings patterned to conform to the inner and outer rings of the wobble motor rotor 52. In FIG. 6B, the desired material for the rotor, such as copper, nickel, or nickel-phosphorous, is deposited to form the inner ring 54 and outer ring 56 to an initial thickness. Then the photoresist layer 106 is again exposed to open up regions 107 patterned in the desired shape of the interconnecting springs or flexible members. The plating is then completed with the same material to give a final height for the inner ring 54 and outer ring 56 and a final thinner height for the springs 60, 62. The photoresist is then removed, leaving the rotor on seedlayer 104, as shown in FIG. 6C. Typical dimensions for the rotor are a diameter for the outer ring of 5–10 mm, a height of 20–60 microns, and an annular thickness for each ring of about 1 mm. The springs or flexible members 60, 62 may have the same height as the rings 54, 56 or a reduced height down to approximately 50% that of the rings.

Figure 6D:
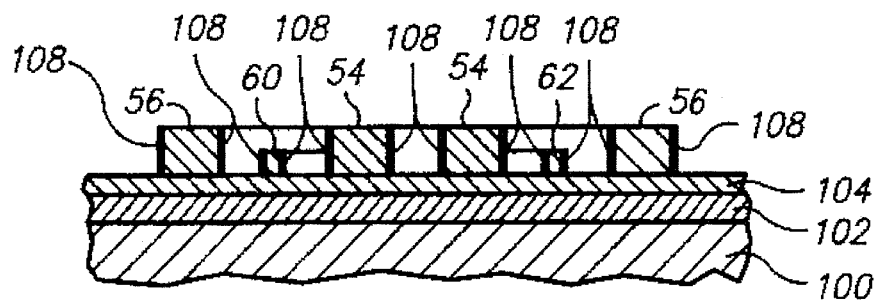

After the plating process is completed to form the rings and interconnecting springs in a single piece of the same material, a thin insulation coating, typically 0.25 micron of Si$_3$N$_4$, is deposited by plasma-enhanced chemical vapor deposition (PECVD) to coat the entire rotor structure. The Si$_3$N$_4$ is then anisotropically etched by reactive ion etching (RIE) with SF$_6$, leaving an insulating layer 108 only on the sidewalls, as shown in FIG. 6D. The seedlayer 104 is then dissolved in an etchant, such as ammonium persulfate, which does not attack the plated rotor materials. The release layer 102 is then dissolved in an etchant, such as dilute HF acid, and the completed rotor removed from the substrate.

The stator 50 and ball bearing assembly 80, onto which the rotor 52 will be placed, are formed separately on substrate 45, as shown in FIGS. 7A–7E. The material used for the substrate 45 for the deposited stator elements 71–78 is a high-expansion material (for example, a material having a linear coefficient of expansion in the range of 7–25×10$^{-6}$/°K.), which is selected to nearly match the expansion coefficient of the material used for the wobble motor rotor and stator elements. Such a material may be a metal or coated metal, such as copper or nickel, or a ceramic, such as alumina or ferrite, or a high coefficient of expansion glass. Alternatively, the substrate can be Si plated with invar (a Ni—Fe alloy) having a coefficient of thermal expansion matched to that of Si.

Figure 7A:
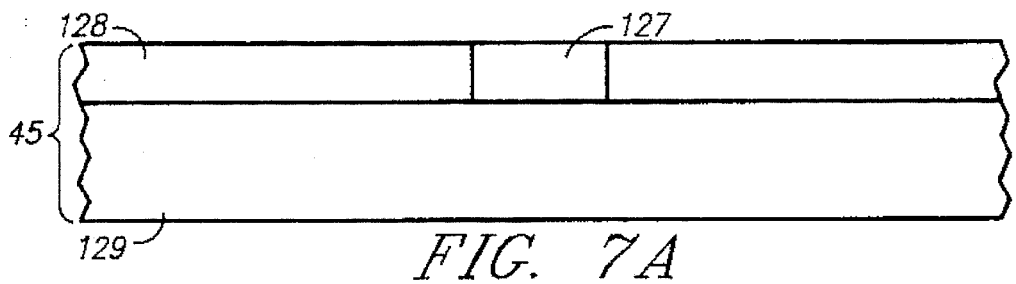
FIGS. 7A–7E are sectional views illustrating the process steps in fabricating the stator portion of the motor of the present invention and the assembly of the rotor and bearing structure.
Figure 7B:
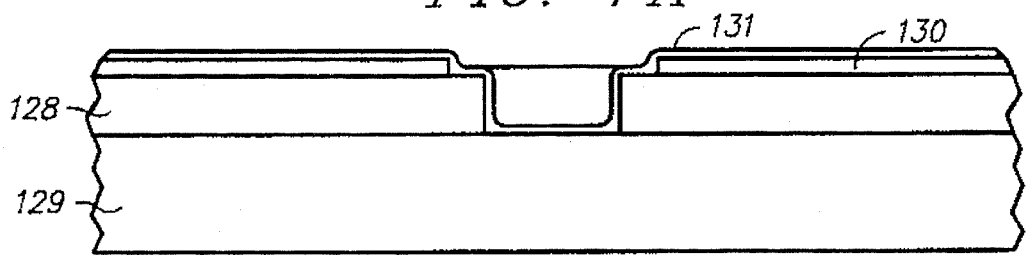
Figure 7C:
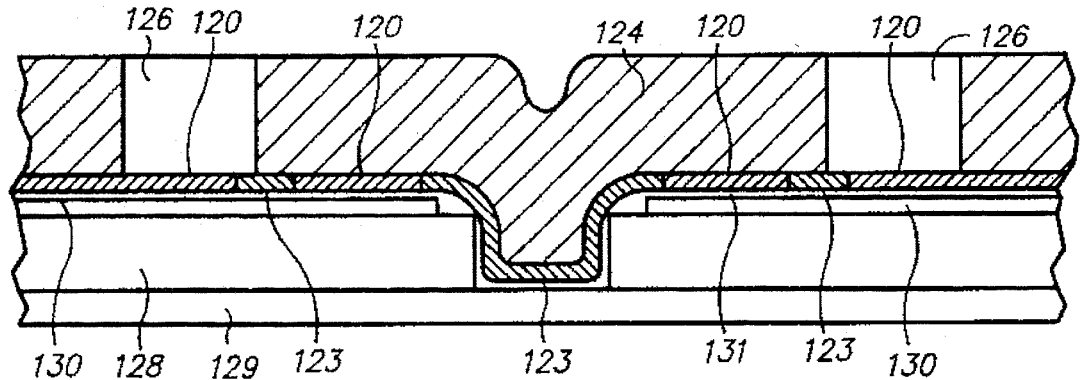
Figure 7D:
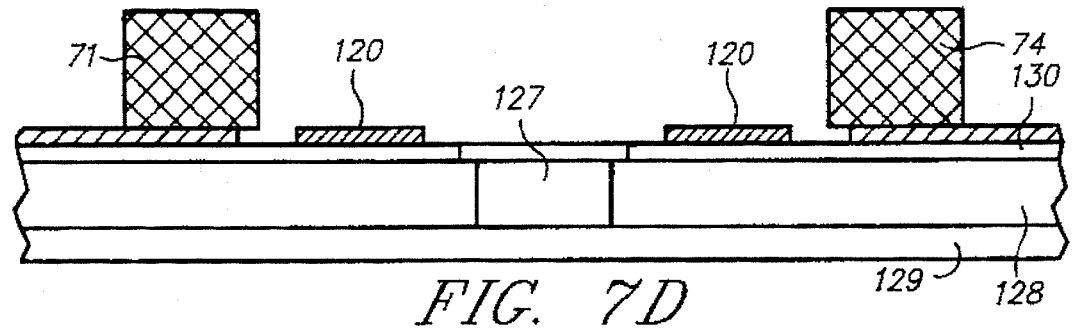

In FIG. 7A, a laminated substrate 45 comprises a lower flat sheet 129 of material such as copper onto which is laminated (by gluing) a prepunched upper copper sheet 128. The upper sheet 128 has a hole 127 for later insertion of the bearing assembly 80. Next, as shown in FIG. 7B, an insulator layer 130 of chemically vapor-deposited SiO$_2$ or sputtered Al$_2$O$_3$ is deposited to a thickness of 1–2 microns, then patterned by etching. This is followed by a seedlayer 131 of copper deposited to a thickness of 0.1 micron. In FIG. 7C, a first layer of photoresist 123 is spray deposited and patterned to define a stencil for electroplating the layer 120 that will form a ground plane beneath the rotor and wiring pattern beneath the sator elements. The layer 120 of copper or nickel is then plated to a thickness of 1 micron in a pattern defined by the stencil. A second, thick layer of photoresist 124 is then applied and patterned to open regions 126 conforming to the shape of the stator elements 71–78. This layer may be sprayed on the substrate in multiple coatings, or may be applied as a dry film, such as Riston (Dupont trademark of PMMA-based dry resist. The stator elements (71, 74 shown in FIG. D) are then formed by plating to a thickness of 20–60 microns. The stator elements are preferably formed of plated copper, nickel, or nickel-phosphorous, or alternatively for a silicon substrate, plated with invar. The photoresist layers 124, 123 are then removed and the seedlayer 131 etched away, leaving the stator structure shown in FIG. 7D.

Figure 7E:
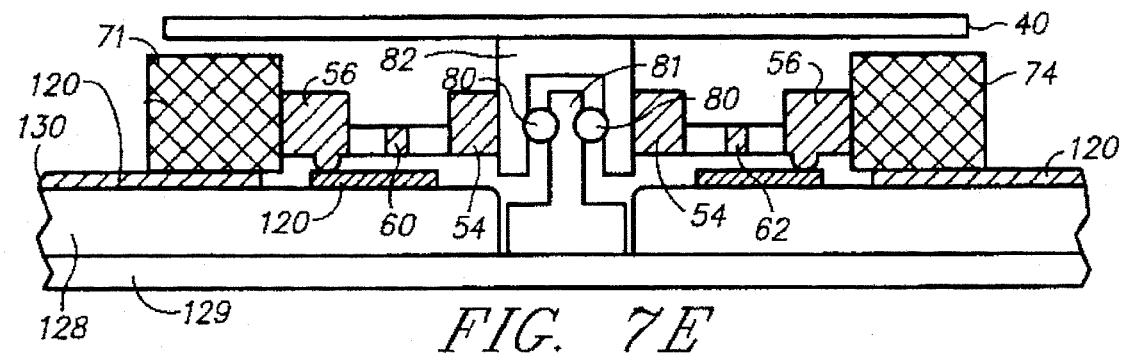

Commercial ball bearing assemblies are available with diameters of about 0.8 mm and heights less than 1 mm. As shown in FIG. 7E, such a ball-bearing assembly 80 is positioned into the hole 127 and the inner bearing race 81 is secured to the substrate using a conventional epoxy. The previously fabricated rotor 52 is then attached to the outer race 82 of the bearing assembly 80, preferably by means of a suitable epoxy. Finally, the disk 40, which is typically formed of glass or a ceramic material, is attached to the inner rotor ring 54, also by use of a suitable epoxy. Alternatively, the rotor 52 and disk 40 can be attached to the bearing assembly 80 before the bearing assembly 80 is bonded into hole 127.

Alternatively, instead of the ball bearing assembly 80, the interface between the inner and outer bearing races can be formed by a jewel bearing or a hydrodynamic oil bearing. Hydrodyamic oil bearings have been demonstrated for use as spindle bearings for application in hard disk drives. For this application, the outer race can be either discrete components assembled into the structure, or fabricated as part of the plated structure with a suitable wear-resistant overcoat, such as carbon. A thrust bearing can also be fabricated into the bottom of the bearing structure to handle the axial loads. Small dimples can be fabricated in the bottom surface of the thrust bearing to control frictional forces during starting and stopping. An axial preload of the bearing can be accomplished through the use of a magnetic force generated by a magnet placed in the center pin. A surface treatment can be used on the exterior of the bearing to contain the oil within the bearing.

FIGS. 8A–8I show a process for fabricating an alternative embodiment of the motor, i.e., a fully integrated motor structure that uses a pin bearing as the bearing structure and does not require assembly of the separate rotor and stator. The stator, rotor, and bearing structure are all formed on the same substrate during the thin film processing sequence. The motor structure is fabricated by first plating the stator and rotor in one step, then applying sidewalls to the stator and rotor, and then plating the pin bearing. (In FIGS. 8A–8I the springs 60, 62 are not shown to avoid cluttering the drawings. However, in the manner described for FIGS. 6A–6D they are formed during the process steps for forming the inner and outer rotor rings 54, 56).

Figure 8A:
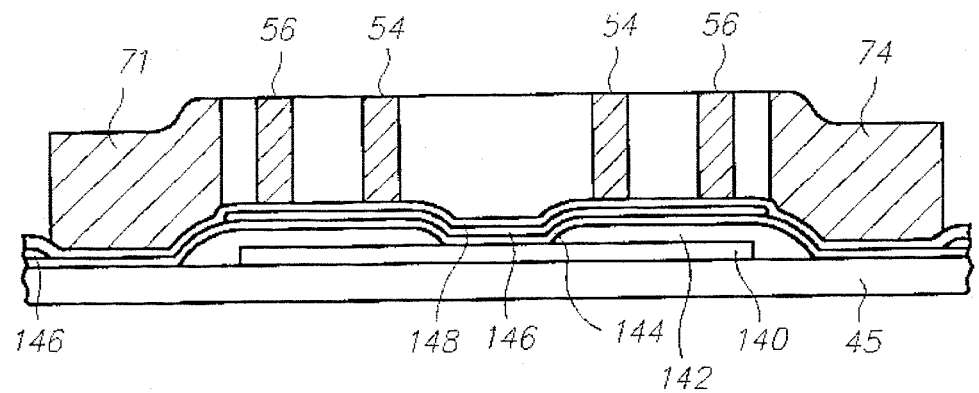

In FIG. 8A, a copper ground plane 140 is first plated to a thickness of 1 micron on substrate 45. Then a 1-micron-thick SiO$_2$ release layer 142 is deposited and an opening for the pin bearing is made into the center of the ground plane 140. This is followed by a first copper seedlayer 144, a 0.1-micron-thick insulating layer 146 of SiO$_2$, and a second copper seedlayer 148. The insulating layer 146 is patterned to make an opening for where the stator elements will be plated. These deposited layers are then coated with a photoresist layer, and the photoresist is exposed to open regions for the stator elements and the rotor. The rotor rings 54, 56 and the stator elements (only elements 71 and 74 are shown in FIG. 8A) are then plated. The separation between the outer diameter of outer rotor ring 56 and the inner diameter of the stator elements is about 2–6 microns.

Figure 8B:
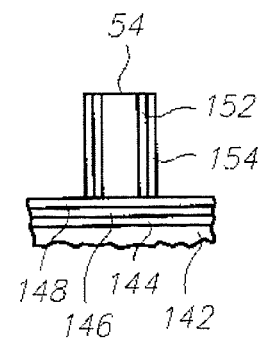
Figure 8C:
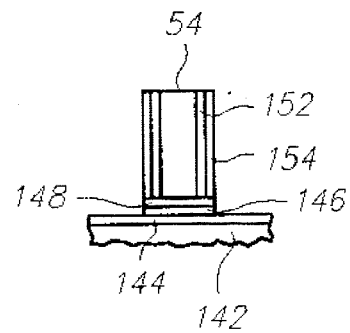
Figure 8D:
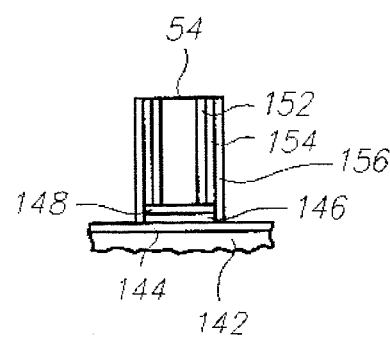

Next, as shown in FIG. 8B, a first 0.25-micron-thick layer 152 of $Si_3N_4$ and a 0.1-micron-thick layer 154 of $SiO_2$ is deposited by PECVD over all the stator elements and rotor, with only the rotor ring 54 being shown as representative. Then an anisotropic etch by RIE with $SF_6$ removes the flat surfaces of these materials, leaving the sidewall coating shown in FIG. 8B, which is an enlarged view of the edges of rotor ring 54. Next, the top seedlayer 148 is removed by a wet etch in ammonia persulfate, and the insulating layer 146 of $SiO_2$ is removed by RIE with $SF_6$, leaving the structure shown in FIG. 8C, which is an enlarged view of the edges of inner rotor ring 54 with the first seedlayer 144 now exposed. In FIG. 8D, an additional layer 156 of $SiO_2$ of 0.1 micron thickness is then applied over the structure and selectively removed so that the edges of the top seedlayer 148 are sealed by the $SiO_2$ layer 156. As a result, the plated stator elements and rotor are isolated from the bottom seedlayer 144.

Figure 8E:
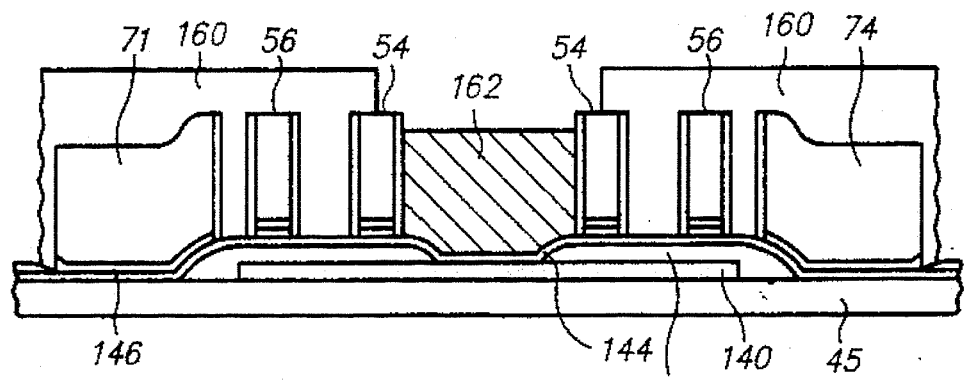
Figure 8F:
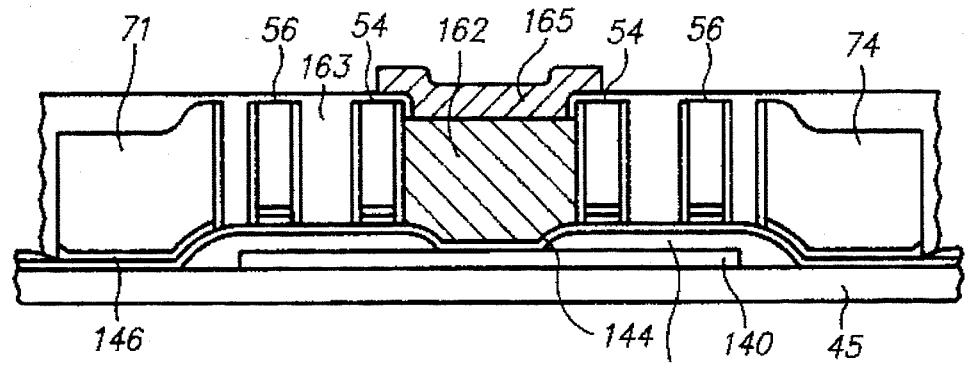

A photoresist layer 160 is then applied over the structure and exposed in FIG. 8E so that the top of the inner rotor ring 54 is partially uncoated. Then the post 162 for the pin bearing is plated. After plating the post 162, the photoresist layer 160 is removed. Additional photoresist 163 is then applied, leaving an opening over the post 162, as shown in FIG. 8F. Copper is then plated over the post 162. This creates a cap 165 over the post that will constrain the inner rotor ring 54 from moving in the axial direction.

Figure 8G:
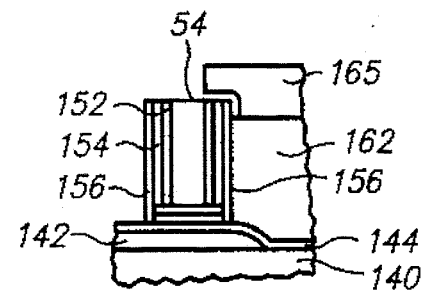
Figure 8H:
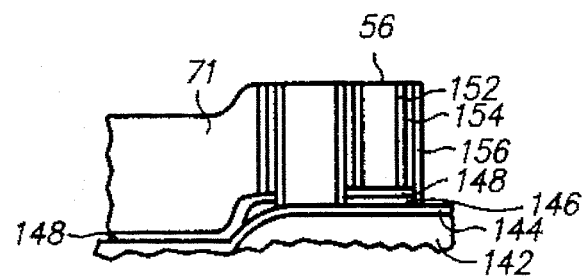
Figure 81:
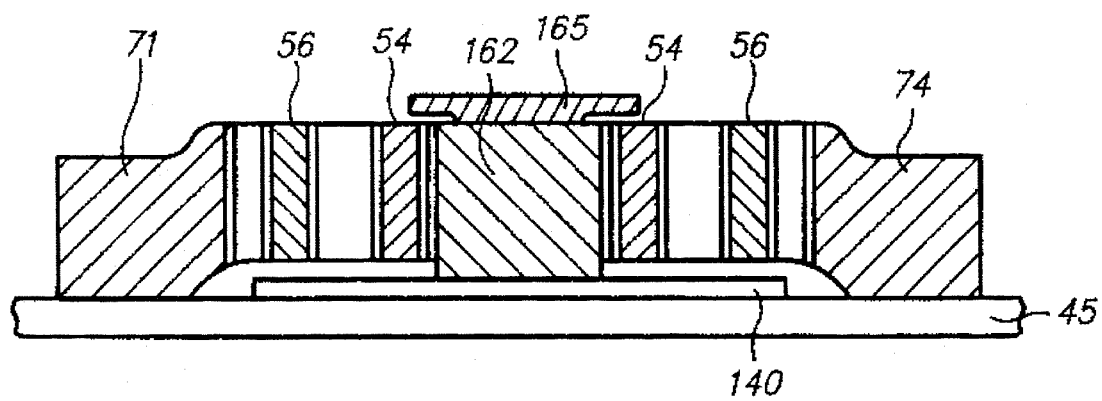

An enlarged view of the inner rotor ring 54, post 162, and cap 165 is shown in FIG. 8G. An enlarged view of the outer rotor ring 56 and stator element 71 is shown in FIG. 8H. At this point in the process, the post 162 and the inner rotor ring 54 are in contact with one another by the $SiO_2$ layer 156 (FIG. 8G) while the stator elements and outer rotor ring 56 are separated (FIG. 8H). Next, the $SiO_2$ sidewalls 156 and 154 are dissolved on the outer rotor ring 56 and stator elements, and between the inner rotor ring 54 and the post 162. The first seedlayer 144 is then dissolved, followed by etching away of the release layer 142. Since $SiO_2$ is used for the release layer 142, dilute HF acid is used. After the release layer 142 is removed, remnants of the second seedlayer 148 and the first seedlayer 144 may remain and these are removed by an additional etch in ammonium persulfate.

The completed motor structure is shown in FIG. 8I. The separation between the inner rotor ring 54 and the post 162 is determined by the thickness of the two $SiO_2$ sidewall depositions. This is typically about 0.2 micron. The insulation between the post 162 and the inner rotor ring 54 is the layer 154 of $Si_3N_4$, which is typically about 0.25 micron. The $Si_3N_4$ layer 154 serves as a wear-resistant bearing film. Other materials, such as diamond-like carbon, could also be used between the post 162 and the inner rotor ring 54. The gap between the outer surface of outer rotor 56 and the inner surface of the stator elements is typically 2–6 microns. This gap size is determined by the lithography step on the first photoresist exposure shown in FIG. 8A.

While the preferred embodiments of the present invention have been illustrated in detail, it should be apparent that modifications and improvements may be made to the invention without departing from the spirit and scope of the invention as described in the following claims.

What is claimed is:

1. An electrostatic motor comprising:

a base;

a stator supported on the base and having a generally cylindrical stator surface centered about an axis extending in an axial direction generally perpendicularly from the base;

a rotor comprising (a) a first ring having a first generally cylindrical surface that is located adjacent to the cylindrical stator surface and has a diameter different from the diameter of the cylindrical stator surface to thereby define a radial gap with the cylindrical stator surface, (b) a second ring, and (c) a plurality of flexible members interconnecting the first and second rings and permitting generally radial movement of the first ring relative the second ring; and a bearing structure for confining motion of the second ring of the rotor to rotary motion, the bearing structure being supported on the base; whereby when an electrostatic potential is applied across said radial gap the first ring rolls around said cylindrical stator surface and moves generally radially relative to the second ring, and the flexible members transfer wobble motion of the first ring to rotary motion of the second ring.

2. The motor according to claim 1 wherein the bearing structure is a rotary ball bearing assembly and the second rotor ring is attached to the rotatable portion of the ball bearing assembly.

3. The motor according to claim 1 wherein the bearing structure is a post attached to the base and the second rotor ring surrounds the post.

4. The motor according to claim 3 further comprising a wear-resistant bearing film formed on either the post or the surface of the second rotor ring adjacent to the post.

5. The motor according to claim 1 wherein the stator comprises a plurality of generally circumferentially-spaced stator elements.

6. The motor according to claim 5 further comprising electrical driver circuitry coupled to the stator elements for generating an electrostatic potential between the stator elements and the first cylindrical surface of the first rotor ring, whereby the first rotor ring is rolled along the stator elements.

7. The motor according to claim 1 wherein the flexible members are curved springs.

8. The motor according to claim 7 wherein the curved springs are generally semicircularly shaped.

9. The motor according to claim 1 wherein the first and second rotor rings and the interconnecting flexible members are formed as a single piece of the same material.

10. The motor according to claim 1 wherein the second rotor ring is located within the first rotor ring and the first rotor ring is located with the stator.

11. The motor according to claim 1 further comprising a data recording disk attached to the second rotor ring.

12. The motor according to claim 1 wherein the base, the stator, and the rotor are formed of materials having substantially the same coefficient of thermal expansion.

13. A data recording disk drive comprising:

a base;

an electrostatic wobble motor based spindle motor comprising (a) a plurality of circumferentially-spaced stator elements supported on the base and defining a generally cylindrical stator surface about a fixed axis extending in an axial direction generally perpendicularly from the base, (b) a rotor having first and second rings and a plurality of flexible members interconnecting the first and second rings and permitting generally radial movement of the first ring relative to the second ring, the first ring having a first generally cylindrical surface that is located adjacent to the cylindrical stator surface and has a diameter different from the diameter of the cylindrical stator surface to define a radial gap with the cylindrical stator surface, and (c) a bearing structure for the second ring of the rotor, the bearing structure being supported on the base and confining movement of the second ring to rotary motion about said fixed axis;

a data recording disk attached to the second ring;

control circuitry coupled to the stator elements for generating an electrostatic potential across said radial gap between the first cylindrical surface of the first rotor ring and each of the stator elements in sequence, whereby the first rotor ring is rolled along the stator elements and the flexible members transfer wobble motion of the first ring to rotary motion of the second ring to rotate the attached data recording disk;

a transducer for reading data from or writing data to the disk; and an actuator connected to the transducer for moving the transducer across the disk.

14. The disk drive according to claim 13 wherein the bearing structure is a rotary ball bearing assembly and the second rotor ring is attached to the rotatable portion of the ball bearing assembly.

15. The disk drive according to claim 13 wherein the bearing structure is a post attached to the base and the second rotor ring surrounds the post.

16. The disk drive according to claim 15 further comprising a wear-resistant bearing film formed on either the post or the surface of the second rotor ring adjacent to the post.

17. The disk drive according to claim 13 wherein the flexible members are curved springs.

18. The disk drive according to claim 17 wherein the curved springs are generally semicircularly shaped.

19. The disk drive according to claim 13 wherein the first and second rotor rings and the interconnecting flexible members are formed as a single piece of the same material.

20. The disk drive according to claim 13 wherein the second rotor ring is located within the first rotor ring and the first rotor ring is located with the circumferentially-spaced stator elements.

21. The disk drive according to claim 13 wherein the disk drive is a contact recording disk drive, and further comprising an integrated head-arm assembly having one end attached to the actuator, the transducer being located within the other end of the integrated head-arm assembly.

* * * * *